United States Patent [19]

Jennewein

[11] 4,276,995
[45] Jul. 7, 1981

[54] GARMENT-HANGING STATION ON A CONVEYOR

[75] Inventor: Manfred A. Jennewein, Mörfelden-Walldorf, Fed. Rep. of Germany

[73] Assignee: Sussman Bügeltechnik GmbH, Walldorf, Fed. Rep. of Germany

[21] Appl. No.: 68,177

[22] Filed: Aug. 20, 1979

[30] Foreign Application Priority Data

Aug. 23, 1978 [DE] Fed. Rep. of Germany ....... 2836750

[51] Int. Cl.³ .................... B65G 47/06; B65H 3/30
[52] U.S. Cl. ..................... 221/15; 198/473; 198/492; 221/294; 221/298; 221/312 A
[58] Field of Search .................. 221/27–29, 221/194, 195, 239, 294, 298, 312 A, 15; 198/473, 474, 492, 532

[56] References Cited

U.S. PATENT DOCUMENTS

| 620,550 | 2/1899 | Nash | 221/298 |
|---|---|---|---|
| 2,630,567 | 3/1953 | Alford | 221/294 |
| 2,930,510 | 3/1960 | Pallissard | 221/312 A X |
| 3,304,499 | 2/1967 | Vincze | 221/298 X |
| 3,762,602 | 10/1973 | Wasil | 221/312 A X |
| 3,915,313 | 10/1975 | Thur et al. | 221/312 A X |

*Primary Examiner*—F. J. Bartuska
*Attorney, Agent, or Firm*—Peter K. Kontler

[57] ABSTRACT

A garment-hanging station associated with a garment-treating station, such as a tunnel finisher, is located along a rail section which slopes downwardly in the advancement direction and on which a plurality of successive clothes hangers is suspended. A singularizing arrangement frees hangers accumulated upstream of the same one at a time for downward sliding on the sloping rail section. The rail section has a transverse slot in which the hook of the freed hanger is received after engaging an abutment surface and in which it is confined by a latch for the duration of a garment-hanging operation. Subsequently, a releasing member expels the hanger hook out of the transverse slot for further downward sliding on the rail section, and the next succeeding hanger is freed by the singularizing arrangement for travel toward the transverse slot.

26 Claims, 17 Drawing Figures

GARMENT-HANGING STATION ON A CONVEYOR

BACKGROUND OF THE INVENTION

The present invention relates to a station at which objects are placed on or removed from elements which are suspended from a conveyor in general, and more particularly to a station at which garments are placed onto hangers which are conveyed by the conveyor along a predetermined path, such as through a station in which the garments hanging on the hangers are treated.

There are already known treating stations of the latter type, which are also known as so-called tunnel finishers, in which smoothing of the garments takes place while such garments pass therethrough. It is also known to hang the garments (which are usually wet or moist) on hangers which are suspended from a conveyor which advances the hangers, and with it the garments hanging thereon, through the treating station. The conveyor may include a conveying rail on which the hooks of the hangers are supported. The rail passes through a garment-hanging station at which the garments are to be placed on the hangers. At this garment-hanging station, the a hanger whose hook freely embraces a rail section, is manually detained and the garment is placed thereon. It will be appreciated that, in this conventional arrangement, the operator can only use one hand for the placing of the garment on the hanger, inasmuch as he or she must hold the hanger with the other hand. Consequently, the garment-hanging operation is relatively cumbersome and time-consuming.

OBJECTS AND SUMMARY OF THE INVENTION

It is an object of the invention to provide a garment-hanging station associated with a conveyor, which does not exhibit the disadvantages of the prior-art garment-hanging stations.

A further object of the invention is to so construct the garment-hanging station as to render it possible to place the garments onto the hangers in an easier and less time-consuming manner than before.

A concomitant object of the invention is to so design the garment-hanging station as to be simple in construction, inexpensive to manufacture, easy to use and reliable.

One feature of the present invention resides, in an arrangement for the conveyance along a predetermined path of suspended elements (hangers) which have objects (garments) supported thereon for joint conveyance at least along a portion of the path, in a combination which comprises a support rail extending at least along a section of the path and supporting a portion of the suspended element, means for temporarily detaining the suspended element on the rail for handling of the respective object, including an abutment which extends at an inclination relative to the path section, and means including a latch for confining the above-mentioned portion of the suspended element between the rail, the abutment and the latch, means for releasing the portion of the suspended element from engagement with the abutment, preferably including a releasing member which is movable into and out of engagement with the aforementioned portion of the suspended element when the latter engages the abutment; and means for effecting relative movement between the aforementioned portion of the suspended element, the abutment and the latch during detaining and releasing phases of operation.

When the conveying arrangement is constructed in the above-discussed manner, that is, when it cooperates with the hangers, the hook of a hanger which is empty is detained by the cooperation of the latch, the abutment and the support rail, so that the operator need no longer worry about keeping the hanger in position while hanging the respective garment thereon. Hence, the operator can use both hands for placing a garment on the detained hanger. After the garment has been properly placed on the hanger, the hanger with the garment hanging thereon can be released by a simple actuation of the effecting means and, upon release, it can be conveyed on the conveyor into the smoothing or other treating station.

Advantageously, the releasing member is rigidly connected with the latch and/or with the abutment. As a result of this, there is obtained, in a simple manner, a forced synchronization of the movements of the parts which are connected with one another.

It is further advantageous when the abutment, the latch and/or the support rail engage the hook of the hanger at least at two pairs of locations, which pairs are spaced from one another transversely of the advancement direction or of the path section, and associated locations being situated substantially opposite one another. In this manner, the hanger is secured against turning about a vertical axis during the placing of the garment thereon. This further facilitates the placing of the garments on hangers.

A simple possibility of securing the hanger against turning about its vertical axis during the placing of the garment thereon is obtained when a transverse slot is provided at the upper surface of the support rail and when the above-mentioned portion of the suspended element or hanger is received therein. This transverse slot engages the hanger hook received therein at least at two pairs of locations, which locations oppose one another as considered in the advancement direction, and which pairs are spaced from one another transversely of the advancement direction.

It is further advantageous when the support rail is inclined downwardly in the region of the garment-hanging station as considered in the advancement direction. In this manner, the hook of the hanger can slide on the support rail due to the weight of the hanger until the hook engages the abutment, and can remain in such position of engagement with the abutment until it is engaged or confined by the latch. Furthermore, after a garment has been placed onto the respective hanger, and the hook has been released, the hook can recommence its downward sliding motion on the inclined rail under the influence of its own weight and that of the garment hanging thereon.

When the support rail is inclined in this manner, a stopping element may be provided at the input end of the garment-hanging station, that is at the upper end of the inclined support rail. This stopping element is movable into and out of the path of movement of the hanger, preferably of the hook of the latter. By resorting to this stopping element, it is possible to release a succeeding hanger for movement toward the abutment only after the garment-hanging operation with respect to the preceding hanger has been at least substantially completed.

The moving arrangement which forms a part of the effecting means can be operated in such a manner that the latch is first transferred into its inactive position and then a releasing cycle of the releasing member is performed. In this manner, it is assured, under all circumstances, that the movements of the releasing member and of the latch do not interfere with one another.

Furthermore, it can be provided for such sequential operation of the parts which constitute a combination of the present invention that, before the return of the latch into its latching position, the stopping element is moved out of the trajectory of movement of the hanger hook at such a point in time that the hanger hook which is released by the stopping element arrives at its position in which it contacts the abutment after the termination of the releasing cycle of operation of the releasing member and before the return of the latch into its latching position. In this manner, it is assured that empty and loaded hangers cannot interfere with the movement of one another at the garment-hanging station.

It is further advantageous when the support rail includes a tube in which the above-mentioned transverse slot is formed and in the interior of which there are accommodated the releasing member and the latch for movement axially of the tubular rail. The latch can be introduced into the plane of the transverse slot during its movement. These expedients result in a compact construction and simultaneously render it possible to achieve guidance for the axially shiftable parts within the tubular support rail.

In this connection,, it is advantageous when the releasing member has a ramp surface which is inclined with respect to the axis of the tubular support rail and which is pressed against that part of the hanger hook that is received in the transverse slot during the releasing phase of movement of the releasing member. The ramp surface is spaced from the latch by a distance which at least corresponds to the width of the transverse slot as considered in the axial direction of the tubular support rail. In this manner, it is assured, on the one hand, that the latch assumes its inactive position prior to the commencement of the releasing phase of operation of the releasing member and, on the other hand, that the portion of the hanger hook which is received in the transverse slot is expelled from the latter in response to axial displacement of the releasing member.

Preferably, provision is made for such an operation of the moving arrangement that the releasing member and the latch perform a return stroke after the termination of the releasing and expelling forward stroke, the return stroke being interrupted for a period of time commencing after the ramp surface leaves the plane of the transverse slot and before the latch extends into the plane of the transverse slot, and which has a duration corresponding to the time of movement of a succeeding hanger released by the stopping element toward and into the transverse slot of the support rail. As a result of this, the time period needed for the hanger hook, following its release by the stopping element, to reach and fall into the empty transverse slot, is made available before the latch closes the transverse slot, but after the releasing member has left the plane of the transverse slot, so that the return movement of the releasing member cannot be blocked by a hanger hook penetrating into the transverse slot.

The tubular support rail can be provided, at its upper portion, with a longitudinally extending slot which intersects the transverse slot. Then, the releasing member may have a portion which extends into this longitudinally extending slot at least up to the upper surface of the tubular supporting rail. Furthermore, the transverse slot can be flanked, at its bordering edges which extend transversely of the elongation of the tubular support rail, by inclined surfaces. In this manner, it is assured, even for a releasing member equipped with the aforementioned inclined ramp surface, that a hanger hook received in the transverse slot is lifted out of the transverse slot and the hook of a succeeding hanger securely penetrates into the transverse slot, despite the finite wall thickness of the tubular support rail.

The stopping element which is arranged at the input end of the garment-hanging station can be provided, at its upper side, with an upwardly extending pointed nose, and the arrangement which moves the stopping element into and out of the trajectory of movement of the hanger hook may include a pin which is movable toward contact with the upper surface of the stopping element, the pin being spaced downstream from the nose of the stopping element by a distance which is greater than once, but smaller than twice, the diameter of the hanger hook at the region which cooperates with the nose and with the pin. This expedient assures that, when two or more hangers accumulate upstream of the stopping element, only one of them can bypass the nose of the stopping element during each cycle of operation of the pin.

The above-mentioned effecting means may include a two-stage driving device which acts on the releasing member and on the latch. When the moving device is constructed in this manner, it is possible, by individually actuating each of the stages, to coordinate the movements of the releasing member and of the latch with one another and, if need be, also with that of the stopping element. The driving device can also be accommodated within the tubular support rail so that there is obtained a very compact construction.

The driving pulse for the latching stroke of the stage which acts on the latch can be delayed with respect to the driving pulse for the return stroke of the stage which acts on the releasing member by a time period which corresponds to the time interval between arrivals of two successive hangers, in order to assure that a succeeding hanger hook engages the abutment before the latch assumes its confining or latching position and after the release of the preceeding hanger has been concluded.

When the two stages of the moving device are arranged in series, the lengths of their strokes are added to one another and their respective portions are forcibly coupled to each other, which simplifies the synchronization of their movements.

It is advantageous when the moving device is constructed as a cylinder-and-piston device. In contradistinction to an electromagnetically operated driving device, which could also be used, a cylinder-and-piston device can be operated by means of a pressurized fluid, such as a pneumatic fluid or a hydraulic fluid. This has the advantage of reducing the danger of fire in the environment of a smoothing station for garments, where the amount of moisture or humidity is usually high.

The cylinder-and-piston device can be constituted by two cylinder-and-piston units which are arranged in series, in order to simplify the synchronization and their construction.

The pin which actuates the singularizing stopping element can be mounted at the free end of the piston rod of a cylinder-and-piston unit, in order to be able to operate even this pin in a pneumatic or hydraulic manner.

Furthermore, the latching stroke of the latch can be triggered in response to the releasing cycle of operation by means of a time-delaying member the time-delay constant of which lasts at least to the end of the releasing cycle. This presents a simple possibility of synchronization of the latching operation with the releasing operation.

The novel features which are considered as characteristic of the invention are set forth in particular in the appended claims. The improved garment-hanging arrangement itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figures 1, 2:
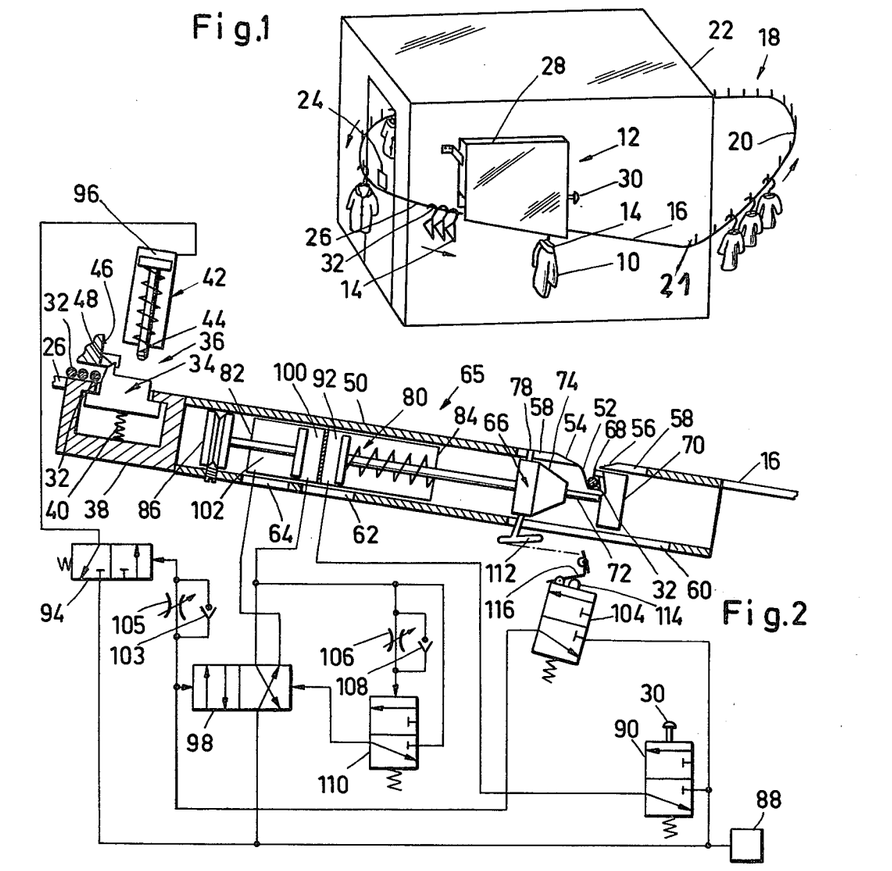
FIG. 1 is a perspective view of an arrangement which includes a tunnel finisher operative for smoothing garments, an endless conveyor, and a garment-hanging station according to the present invention arranged along the path of the conveyor.
FIG. 2 is a partially diagrammatic and partially sectioned view of the elements which constitute the garment-hanging station of the present invention.

Referring now to the drawing in detail, and first FIG. 1 thereof, the reference numeral 22 has been used to identify a treating station, especially a tunnel finisher, which is capable of treating, especially smoothing, garments. A moist garment which is delivered to a garment-hanging station 12 from a washing machine which is of a conventional construction and hence has not been illustrated, is placed onto a clothes hanger 14 which is temporarily detained at the garment-hanging station 12. After the release of the hanger 14, the latter, together with a garment 10 hanging thereon, slides on a downwardly inclined rail section 16 of an endless conveyor 18, due to gravitational forces, to a section 20 of the endless conveyor 18, where an entraining member 21 guided in an upper longitudinal slot of a tubular member surrounding or forming the section 20 of the conveyor 18, engages the hook of the hanger 14 and entrains the latter for movement longitudinally of the conveyor 18 and through the tunnel finisher 22. The same procedure is then repeated for the following garments 10.

In the treating station 22, the garments 10 are subjected to the action of steam and hot air, so that they become smooth. The hangers 14 with the smooth garments 10 hanging thereon, leave the treating station 22 at its other end, and the hangers 14 are temporarily halted at a removal location 24. At this removal location 24, the smooth garments 10 are removed from the hangers 14, and the empty hangers 14 are suspended from a downwardly inclined rail section 26 of the conveyor 18 so that they again slide, due to their own weight, toward the garment-hanging station 12. Only a downwardly open housing 28 and an actuating button 30 of the garment-hanging station 12 have been illustrated in FIG. 1. Further details of the garment-hanging station 12 are illustrated in FIGS. 2–5 which show the components of the arrangement of the present invention which are accommodated in the interior of the housing 28. Each of the hangers 14 has a hook 32 which, during the downward sliding on the rail section 26 of the conveyor 18, abuts against a stopping element 34 of a hanger singularizing arrangement 36. The stopping element 34 extends into the trajectory of movement of the hook 32 so that, should the number of hangers 14 reaching the stopping element 34 exceed the handling capacity of the garment-hanging station 12, the hangers 14 start to accumulate upstream of the stopping element 34. The stopping element 34 is accommodated in a recess of a rail section 38 for movement between a position in which it extends into, and a position in which it is spaced from, the trajectory of movement of the respective hook 32. A spring 40 urges the stopping element 34 towards its first-mentioned position. In order to move the stopping element 34 into its second-mentioned position, the hanger singularizing arrangement 36 further includes a cylinder-and-piston unit 42 having a piston rod the free end 44 of which constitutes an actuating pin. The actuating pin 44 is situated downstream, as considered in the advancement direction of the hangers 14, from a pointed nose 48 which extends upwardly from the stopping element 34 into a recess of a holding member 46. The spacing, as measured in the advancement direction, between the actuating pin 44 and the nose 48 equals at least once, and is smaller than twice, the diameter of a hanger hook 32.

When the cylinder-and-piston unit 42 is actuated, the actuating pin 44 pushes the stopping member 34, including its nose 48, into the above-mentioned recess of the rail section 38 until the nose 48 no longer projects above the upper surface of the rail section 38. Then, the hook 32 slides downwardly on the inclined rail section 38 until it contacts the actuating pin 44. During the return movement of the actuating pin 44, the nose 48 of the stopping element 34 penetrates between the first and the second hooks 32, so that only the first or leading hook 32 can subsequently slide further down while the second and/or following hooks 32 are pressed back by the nose 48. As a result of that, only one hook 32 or hanger 14 is freed for further movement during each actuation of the cylinder-and-piston unit 42.

A tubular rail section 50 adjoins the rail section 38 of the singularizing arrangement 36. The rail section 50 is also inclined downwardly as considered in the advancement direction. The tubular rail section 50 is provided at its upper surface with a substantially vertical transverse slot 52. The transversely extending edges which bound the transverse slot 52 are adjoined by inclined surfaces 54 and 56 which extend at least over the wall thickness of the tubular rail section 50. The transverse slot 52 has a width, as considered in the advancement direction, which at least correponds to the diameter of the hanger hook 32, so that the transverse slot 52 is capable of receiving the hook 32 of a hanger 14. Consequently, a front transverse surface 53 which partially bounds the transverse slot 52 serves as an abutment for the respective hanger hook 32.

Figure 3:
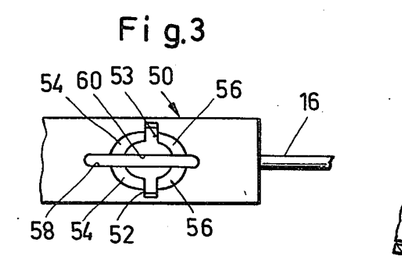
FIG. 3 is a top plan view of a downstream end of a support rail defining a part of the conveying path within the garment-hanging station of FIGS. 1 and 2.

As may be seen from a comparison of FIGS. 2 and 3, the tubular rail section 50 is provided at its upper surface with a longitudinally extending slot 58 which intersects the transverse slot 52 and transcends the inclined surfaces 54 and 56. It may further be seen in FIG. 2 that longitudinally extending slots 60, 62 and 64 are provided in the tubular rail section 50. The rail section 16 adjoins the downstream end of the tubular rail section 50 at the upper surface of the latter. The rail sections 26, 38, 50 and 16 together from a conveyor rail 65 which passes through the garment-hanging station 12.

A releasing member 66 which is constructed as an expeller, and a latch 68, are mounted within the tubular rail section 50 for axial shifting. The latch 68 has a pin-shaped configuration and extends in the axial direction of the tubular rail section 50, being connected to a cylindrical member 70 which is rigidly connected with the releasing member 66 via a rod 72.

The releasing member 66 has a frustoconical front portion, as considered in the advancement direction, so that it forms a ramp surface 74 which is inclined downwardly relative to the axis of the tubular rail section 50 in the frontward direction. The ramp surface 74 contacts and engages that portion of the hook 32 which is received in the transverse slot 52 during the movement of the releasing member 66 in the rightward direction as seen in FIG. 2, thus causing the hook 32 to rise in the transverse slot 52 as it slides along the ramp surface 74 during releasing phase of operation of the releasing member 66. The releasing member 66 further has a projection 78 which extends into the longitudinally extending slot 58. The free end of the projection 78 is substantially flush with the upper surface of the rail section 50. The projection 78 serves for forwarding the hook, after its lifting from the transverse slot 52 by the action of the ramp surface 74, along the inclined surface 56 up to the upper surface of the tubular rail section 50. Thereafter, the hook 32, and with it the hanger 14 and the garment 10 supported thereon, continue to move downwardly along the remainder of the tubular rail section 50 onto and along the rail section 16.

Furthermore, a two-stage moving device constructed as a cylinder-and-piston arrangement 80 is accommodated in the interior of the tubular rail section 50. The device 80 includes two cylinder-and-piston units 82 and 84 which are arranged in series with one another. The cylinders of these units 82 and 84 are rigidly connected to one another and are received in the tubular rail section 50 for axial shifting. The free end of the piston rod of the cylinder-and-piston unit 82 is connected to a disc 86 that is affixed to the tubular rail section 50. The free end of the piston rod of the cylinder-and-piston unit 84 is rigidly connected with the releasing member 66.

A pressurized fluid, preferably pressurized air, can flow from a pressurized fluid source 88 through a switching valve 90 into a working chamber 92 of the cylinder-and-piston unit 84, via a switching valve 94 into a working chamber 96 of the cylinder-and-piston unit 42, via a switching valve 98 either in a working chamber 100 or into a return chamber 102 of the cylinder-and-piston unit 82, and via a switching valve 104 to an actuating input of the valve 94 via a one-way valve 103 connected in parallel with an adjustable backflow throttle 105, and directly to an actuating input of the switching valve 98. From the output of the switching valve 98 which is connected with the working chamber 100 of the cylinder-and-piston unit 82, the pressurized fluid can flow, on the one hand, via an adjustable time-delay throttle 106 arranged in parallel with a one-way valve 108 to the actuating input of a switching valve 110 and, on the other hand, via switching valve 110 to the return input of the switching valve 98. The switching valve 104 is actuated by projection 112 of the releasing member 66 which passes through the longitudinal slot 60 of the tubular rail section 50, via a lever 116 which is pivotable against an actuating pin 114 and whose upper arm extends into the range of movement of the projection 112. The upper arm of the lever 116 is mounted on the remainder of the lever 116 for pivoting about its own pivoting axis, in clockwise direction, until it abuts an upwardly extending portion of the remainder of the lever 116, this latter pivoting being caused by the action of a weak torsion spring. The return movement of each of the switching valves 94, 98, 104 and 110, as well as of the pistons of the cylinder-and-piston units 42 and 84 is caused by a respective return spring in each instance.

The position which is illustrated in FIG. 2 constitutes the rest or latching position, in which the latch 68 extends into the transverse slot 52 upwardly of a hanger hook 32 received in the latter. In this position, the hook 32 not only cannot be moved in the vertical direction, but it also cannot turn about a vertical axis inasmuch as the transverse slot 52 engages the same at least at the two locations situated frontwardly and rearwardly and spaced transversely of the advancing direction. Furthermore, a lateral shifting of the hanger 14 is also prevented due to the curved configuration of the hanger hook 32. As a result of this, a garment 10 can be placed onto the hanger 14 in this position, without having to retain the hanger 14 in such a position. As a consequence thereof, the operator can use both hands for holding the garment 10 and hanging the same on the arrested hanger 14.

After the placement of the garment 10 on the arrested hanger 14, the operator actuates the actuating button 30 of the switching valve 90. Thereafter, this switching valve 90 admits the pressurized fluid from the pressurized fluid source 88 into the working chamber 92 of the cylinder-and-piston unit 84, so that the piston of this unit 84 shifts the releasing member 66 and simultaneously also the latch 68 in the rightward direction, that is, the advancement direction of the conveyor 18. After the latch 68 has left the transverse slot 52 and thus has set the hanger hook 32 free (compare FIG. 5), there begins the releasing phase of operation of the releasing member 66 during which the ramp surface 74 presses against the hanger hook 32 which is received in the transverse slot 52, so that the hanger hook 32 slides along the ramp surface 74 and is lifted within the transverse slot 52. Simultaneously therewith, the projection 112 of the release member 66 presses, via the lever 116, on the actuating pin 114 of the switching valve 104, so that the latter admits the pressurized fluid to the actuating inputs of the switching valves 94 and 98 and these valves 94 and 98 are actuated. As a result of this switching of the valve 98, the pressurized fluid is admitted into the working chamber 100 so that the interconnected cylinders of the cylinder-and-piston device 80 and the piston of the cylinder-and-piston unit 84 are shifted in the rightward direction, that is, in the advancement direction of the conveyor 18. As a result of this additional rightward displacement of the piston of the cylinder-and-piston unit 84 and thus of the releasing member 66, the hanger hook 32 is entrained by the projection 78 of the releasing member 66 and shifted over the inclined surface 56 onto the upper surface of the tubular rail section 50. From there, the hanger hook 32 slides, owing to the weight of the hanger 14 and the garment 10 hanging thereon, downwardly on the inclined tubular rail section 50. The position of the releasing member 66 and of the latch 68 which is finally reached in the forward stroke of the arrangement is illustrated in FIG. 4.

Figure 5:
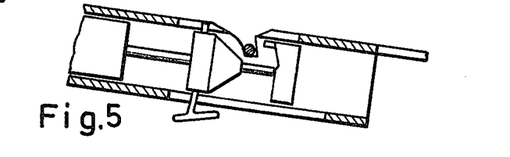
FIG. 5 is a view similar to that of FIG. 4 but in a position after the termination of the releasing phase and prior to the commencement of the latching phase.

As soon as the operator discontinues the pressure on the pushbutton 30, the switching valve 90 opens the passage for return flow of the pressurized fluid out of the working chamber 92 of the cylinder-and-piston unit 84, the return spring of the cylinder-and-piston unit 84 expands, and the releasing member 66, together with the latch 68 is returned into the position illustrated in FIG. 5. When this happens, the releasing phase of operation of the releasing member 66 comes to an end.

Figure 4:
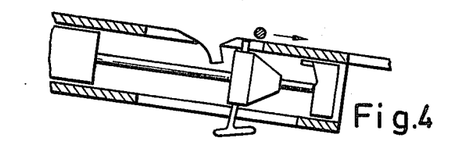
FIG. 4 is a longitudinal sectional view of a detail of FIG. 2 during a releasing phase of operation of the garment-hanging station.

During the return stroke of the releasing member 66 from the position illustrated in FIG. 4, the upper arm of the lever 116 is tilted about its pivot against the force of the weak torsion spring by the projection 112 in the counterclockwise direction, but the lever 116 is not lifted off the actuating pin 114 inasmuch as its left end abuts the housing of the switching valve 104.

The switching valve 98 retains its position assumed during the forward stroke of the releasing member 66 as determined by the switching valve 104. In this position, the fluid in the working chamber 100 is still at the pressure of the source 88, for such a period of time until such a high pressure has built up at the actuating input of the switching valve 110 via the throttle 106 that it suffices for actuating the switching valve 110. Only after the expiration of the time-delay interval which is adjusted at the throttle 106, which time-delay interval starts with the actuation of the pushbutton 30, is the switching valve 98 again returned into its rest position via the switching valve 110. In this rest position, the return chamber 102 is again supplied with pressurized fluid and the cylinders of the cylinder-and-piston device 80 are returned to their initial positions. In the event that the pushbutton 30 has been released within this time-delay interval, which can be assured with a high degree of probability by adjusting the throttle 106 to a correspondingly long time-delay period, the cylinder-and-piston device 80 and, consequently, the releasing member 66 and the latch 68 return into the positions illustrated in FIG. 2 after the expiration of this time-delay period.

After the release of the pushbutton 30, but still during the time-delay interval of the time-delay member which is constituted by the throttle 106 and the valves 98 and 110, the releasing member 66 and the latch 68 temporarily assume the positions illustrated in FIG. 5. In the positions of the releasing member 66 and of the latch 68 which are illustrated in FIG. 5, a hanger hook 32 previously released by the singularizing arrangement 36 can fall into the transverse slot 52. In order to assure that the new hanger hook 32 indeed falls into the transverse slot 52 in this position, the operation of the singularizing arrangement 36 is also dependent on the actuation of the switching valve 90 in the manner which will now be described. After the actuation of the switching valve 90 via the pushbutton 30, as already explained above, the switching valve 104 is actuated by the projection 112 of the releasing member 66 which moves in the frontward direction and, thereafter, immediately actuates the switching valve 94 via the one-way valve 103. Consequently, the switching valve 94 admits the pressurized fluid to the working chamber 96 of the cylinder-and-piston unit 42 during the frontward stroke of the releasing member 66. As a result of this, the actuating pin 44 presses the stopping member 34 inclusive of the nose 48 out of the trajectory of movement of the hooks 32 of the hangers 14 which accumulate upstream of the stopping element 34. Thus, the hooks 32 can now slide downwardly, but only until they reach the actuating pin 44. However, the return movement of this actuating pin 44 under the influence of the return spring of the cylinder-and-piston unit 42 is somewhat delayed by the throttle 105 following the disappearance of an actuating impulse which is transmitted, for a short period of time to the switching valve 94 via the switching valve 104 (during the movement of the projection 112 past the lever 116), inasmuch as the slide of the switching valve 94, due to the action of the throttle 105 and the one-way valve 103, cannot be returned immediately after the disappearance of the actuating impulse. The return time-delay period of the switching valve 94 and thus of the cylinder-and-piston unit 42 is so selected by correspondingly adjusting the throttle 105 that, during this time-delay period, a new hanger hook 32 can arrive at the actuating pin 44 after moving the stopping element 34 out of the trajectory of movement of the hanger hooks 32. After the expiration of this time-delay period, the actuating pin 44 is retracted out of the trajectory of movement of the hanger hooks 32. Simultaneously therewith, the nose 48 of the stopping element 34 penetrates between the hanger hook 32 which abuts the actuating pin 44 and the following hanger hook 32. As a result of this, only the first hanger hook 32 is released by the actuating pin 44, while the following hooks 32 are detained by the nose 48.

The time-delay period of the time-delay device 98, 106 and 110 is so adjusted at the throttle 106 that the hook 32 which is freed by the actuating pin 44 for downward sliding on the tubular rail section 50 reaches the transverse slot 52 while the releasing member 66 and the latch 68 assume the positions illustrated in FIG. 5. After the expiration of this time-delay period, the pressurized fluid is again admitted into the return chamber 102 of the cylinder-and-piston unit 82 via the returned switching valve 98 and the releasing member 66 and the latch 68 are returned into the positions illustrated in FIG. 2 in which the hanger hook 32 which has just fallen into the transverse slot 52 is confined in the latter by the latch 68. This cycle of operation is repeated following the next actuation of the button 30.

At least those sections of the pressurized fluid conduits which are connected to the cylinder-and-piston device 80 are flexible so that they can participate in the movement of the cylinder of this cylinder-and-piston device 80.

In order to assure that the releasing member 66 and the latch 68 assume the positions illustrated in FIG. 5 and retain the same until a new hanger hook 32 drops into the transverse slot 52, even when the actuating button 30 is depressed for a time period which exceeds that corresponding to the time-delay period adjusted at the throttle 106, an advantageous modification of the present invention resides in the fact that the switching valve 104 is mounted for turning about the axis of its valving element through 180°. In this modification, the switching valve 104 is actuated by the projection 112 of the releasing member 66 only during the return stroke of the cylinder-and-piston unit 84 which occurs after the release of the button 30. As a result of this, the time-delay periods adjusted at the throttles 105 and 106 commence only after the release of the button 30, for all intents in purposes, at the moment at which the releasing member 66 and the latch 68 assume the positions illustrated in FIG. 5. Thus, the time-delay period of the throttle 106 need only be adjusted to a length which corresponds to the time of sliding of the hanger hook 32 from the stopping element 34 to the transverse slot 52 at its maximum.

Figure 6A:
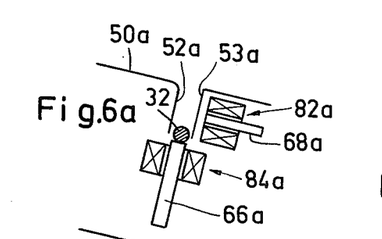
FIGS. 6a–6c are somewhat diagrammatic views of another latching and releasing arrangement, which can be used instead of that shown in FIGS. 2 to 5, in three different phases of operation thereof.
Figures 6B, 6C:
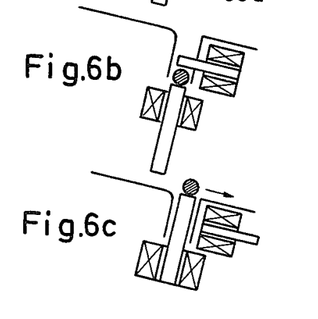

A modification is diagrammatically illustrated in FIGS. 6a–6c. Instead of the cylinder-and-piston device 80, it includes two electromagnets 82a, 84a with plunger armatures or cores 66a and 68a. Herein, the plunger armature 66a constitutes the releasing member and the plunger armature 68a constitutes the latch. The actuation of the plunger armatures 66a and 68a is so timely coordinated that the plunger armatures 66a and 68a are first retracted while the hanger hook 32 drops into the transverse slot 52a after being stopped by the abutment 53a (see FIG. 6a) then the plunger armature 68a is extended into the transverse slot 52a upwardly of the hanger hook 32 (see FIG. 6b) then, following the placement of the garment 10 on the hanger 14, the plunger armature 68a is again retracted and, finally, the plunger armature 66a performs a releasing stroke (into the position of FIG. 6c), whereafter it is returned into the position illustrated in FIG. 6a. The tubular rail section 50a can again be provided, as in the embodiment described in connection with FIGS. 2–5, with the longitudinally extending slot 58 and with the inclined surfaces 58 and 56. Under certain circumstances, the plunger armature 66a can be provided with a transverse portion at its upper end so that it has a T-shaped configuration which fits into the longitudinally extending slot 58.

Figure 7A:
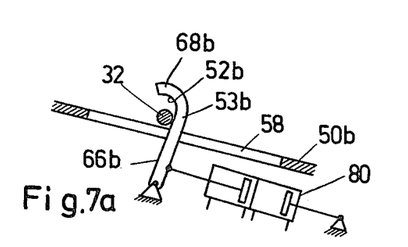
FIGS. 7a–7c are views similar to those of FIGS. 6a–6c but of still another latching and releasing arrangement.
Figure 7B:
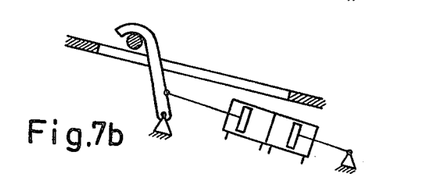
Figure 7C:
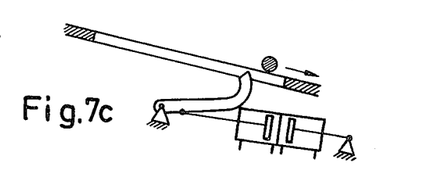

FIGS. 7a–7c diagrammatically illustrate another modification in which the cylinder-and-piston device 80 actuates a lever 66b which constitutes the release member. The lever 66b is mounted on the tubular rail section 50b for pivoting within the same and extends through the longitudinal slot 58. The transverse slot 52 can be omitted in this modification. The lever 66b is provided at its free end with a hook 68b which constitutes the latch. The lever section 53b which adjoins the hook 68b constitutes the abutment for the hanger hook 32. The inner surface 52b of the hook 68b corresponds, as to its function, to the transverse slot 52, except that it is somewhat shorter in the transverse direction than the transverse slot 52.

In the position of the lever 66b which is illustrated in FIG. 7a, a hanger hook 32 which slides downwardly on the tubular rail section 50b can abut the lever section 53b. Thereafter, the lever 66b is pivoted opposite to the advancement direction, that is, leftwardly, so that it confines the hanger hook 32 between the hook 68b, the section 53b and the upper surface of the tubular rail section 50b (see FIG. 7b) for the duration of the garment-placing operation. In order to release the hanger hook 32, the lever 66b is pivoted into the position of FIG. 7c in which it is entirely retracted under the upper surface of the tubular rail section 50b. From there, the lever 66b is again pivoted into the position illustrated in FIG. 7a for intercepting a further hanger hook 32.

Figure 8A:
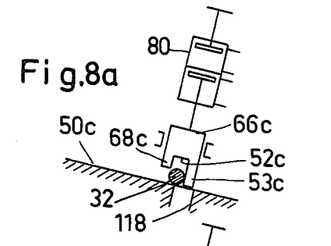
FIGS. 8a–8c are views corresponding to those of FIGS. 6a–6c but of a further latching and releasing arrangement.
Figures 8B, 8C:
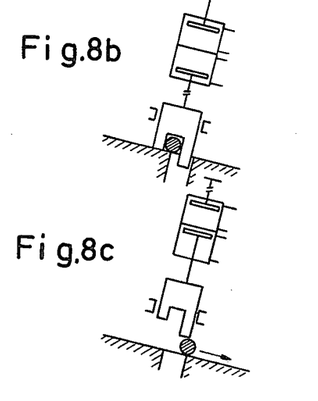

In the embodiment of the present invention which is illustrated in FIGS. 8a–8c, the releasing member 66c is mounted for displacement substantially normal to the upper surface of the tubular rail section 50c. The releasing member 66c is provided with a projection 53c which is located downstream as considered in the advancement direction and constitutes the abutment, and a shorter projection 68c which is situated upstream and which performs the function of the latch. In the position illustrated in FIG. 8a a hanger hook 32 which slides downwardly on the tubular rail section 50c eventually abuts the projection 53c. From this position, the releasing member 66c is then shifted into the confining position illustrated in FIG. 8b, in which the projection 53c extends into a recess 118 provided in the upper surface of the tubular rail section 50c, and the projection 68c rests against the upper surface of the tubular rail section 50c. Finally, the releasing member 66c is moved from the position of FIG. 8b into releasing position according to FIG. 8c and from there again into the intercepting position of FIG. 8a. The transverse slot 52c between the projections 68c and 53c is relatively long as considered in a direction transversely of the advancement direction so that the hanger hook 32 is well confined from all sides in the position according to FIG. 8b. In this modification, a rail of solid cross section or a rod can be used instead of the tubular rail section 50c.

Figures 9A, 9B:
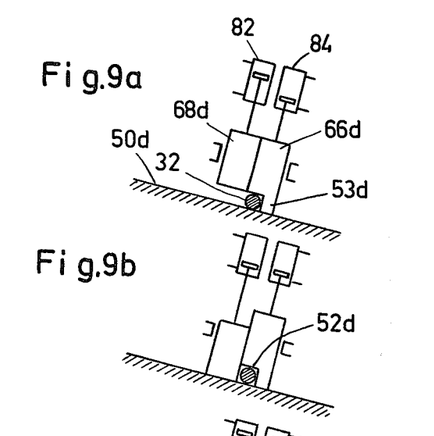
FIGS. 9a–9c are views again corresponding to those of FIGS. 6a–6c but of an additional latching and releasing arrangement.
Figure 9C:
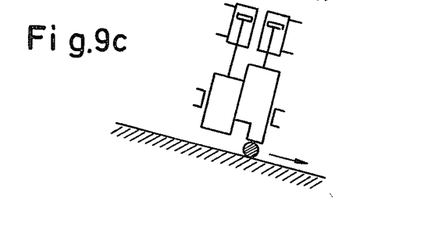

The modification according to FIGS. 9a–9d also incorporates a releasing member 66d which is mounted for movement substantially normal to the upper surface of the tubular rail section 50d. This releasing member 66d is operated only by the cylinder-and-piston unit 84. The releasing member 66d is also provided with a projection 53d which can rest on the upper surface of the tubular rail section 50d and serves as the abutment for intercepting the hanger hook 32 which descends on the tubular rail section 50d. A sliding member 68d is provided as the latch, this sliding member 68d being mounted independently of the releasing member 66d for movement substantially normal to the upper surface of the tubular rail section 50d. The sliding member 68d is operated by the cylinder-and-piston unit 82. FIGS. 9a–9c again illustrate the intercepting, confining and releasing positions of the releasing member 66d and the latch 68d. The transverse slot 52d which is formed in the position according to FIG. 9b has the same function as the transverse slot 52. Here again, a rail or rod of solid cross section can be provided instead of the tubular rail section 50d.

The two last-discussed modifications according to FIGS. 8a–9c have the advantage that the force which is needed for the actuation of the releasing member 66c or 66d is smaller than that required in the previously discussed embodiments, in that it need not be operated against a component of the weight of the hanger 14 and the garment 10 hanging thereon.

In all instances, electromagnets with corresponding electric control arrangements can be used instead of the cylinder-and-piston units, so long as the electric circuitry includes time-delay members. However, a pneumatically or hydraulically operated moving means for the releasing member, the latch and the singularizing arrangement is currently preferred inasmuch as it has the advantage that it constitutes a lesser peril of fire in the usually wet or moist environment of a tunnel finisher.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended withing the meaning and range of equivalence of the claims.

I claim:

1. In an arrangement for the conveyance along a predetermined path of suspended elements which have objects, particularly of hangers which have garments, supported thereon for joint conveyance at least along a portion of the path, a combination comprising a support rail extending at least along a section of the path and supporting a portion of a suspended element; means for temporarily detaining the suspended element on said rail for handling of the respective object, including an abutment inclined relative to the path section, and means including a mobile latch for confining said portion of the suspended element between said rail, said abutment and said latch; means for releasing said portion of the suspended element from engagement with said abutment; and means for effecting relative movement between said portion of the suspended element, said abutment and said latch during detaining and releasing phases of operation.

2. The combination as defined in claim 1, wherein said releasing means includes a releasing member movable into and out of engagement with said portion of the respective suspended element when the latter engages said abutment.

3. The combination as defined in claim 2, wherein said releasing member is mounted on one of said latch and abutment.

4. The combination as defined in claim 3, wherein said releasing member is rigidly connected to said latch.

5. The combination as defined in claim 2, wherein at least two of said abutment, latch and rail engage said portion of the suspended element at a pair of locations each, such pairs of locations being spaced from one another transversely of said path section.

6. The combination as defined in claim 5, wherein the locations of the two pairs are situated substantially opposite one another across said portion of the suspended element as considered longitudinally of said path section.

7. The combination as defined in claim 2, wherein said rail has at its upper surface a transverse slot partially bounded by said abutment and operative for receiving said portion of the suspended element.

8. The combination as defined in claim 2, wherein said rail is inclined downwardly in the conveying direction at least immediately upstream and downstream of said abutment.

9. The combination as defined in claim 2; and further comprising a stopping element mounted upstream of said abutment for movement into and out of said path section.

10. The combination as defined in claim 2, wherein said effecting means includes moving means, and means for so operating said moving means that the latch is retracted first and then the full cycle of operation of said releasing means is performed.

11. The combination as defined in claim 10; further comprising a stopping element mounted upstream of said abutment for movement into and out of said path section, and means for so moving said stopping element in dependence on the operation of said operating means that the same leaves said path section after the conclusion of the operating cycle of said releasing means and a sufficient period of time prior to movement of said latch into its confining position to permit the next-following suspended element to be freed by said stopping element to advance into engagement with said abutment.

12. The combination as defined in claim 2, wherein said rail is tubular and has at its upper surface a transverse slot partially bounded by said abutment and operative for receiving said portion of the suspended element; and wherein said latch and said releasing member are so mounted within said tubular rail as to be jointly displaceable between a releasing position and a confining position in which latter position said latch extends into said transverse slot.

13. The combination as defined in claim 12, wherein said releasing member has a ramp surface which is inclined relative to the axis of the tubular rail and which is engageable with said portion of the suspended element that is received in said transverse slot of said rail during axial shifting of said releasing member.

14. The combination as defined in claim 13, wherein said latch and said releasing member are connected to one another for joint shifting in said tubular rail; and wherein said ramp surface is spaced from said latch by a distance which at least corresponds to the width of said transverse slot as considered in the conveying direction.

15. The combination as defined in claim 13, wherein said effecting means includes means for moving said connected latch and releasing member, and means for so operating said moving means in an arresting phase of operation following a releasing phase that the movement is stopped for a predetermined period of time after said ramp surface leaves said transverse slot and before said latch enters the latter.

16. The combination as defined in claim 15; further comprising a stopping element mounted upstream of said abutment for movement into and out of said path section; and wherein said predetermined time period suffices to permit the next-following suspended element freed by said stopping element at the beginning of said time period to reach and enter said transverse slot.

17. The combination as defined in claim 12, wherein said tubular rail has at its upper surface a longitudinal slot intersecting said transverse slot; wherein said releasing member has a portion which extends into said longitudinal slot at least up to said upper surface; and wherein said rail has marginal portions bounding said transverse slot and having inclined upper surfaces.

18. The combination as defined in claim 12; further comprising a stopping element movably mounted in said tubular rail upstream of said abutment and having a pointed nose extending upwardly of the rail and into said path section in an extended, and received within the rail in a retracted position of said stopping element, means for urging said stopping element toward said extended position, and means for moving said stopping element toward said retracted position, including a pin movable into engagement with the upper surface of said stopping element and spaced from said pointed nose in the downstream direction by a distance greater than the width, and smaller than twice the width, of said region of the respective suspended element as considered longitudinally of said rail.

19. The combination as defined in claim 2, wherein said effecting means includes a two-stage moving device acting on said latch and on said releasing member.

20. The combination as defined in claim 19, wherein said rail is tubular; and wherein said moving device is accommodated within said rail.

21. The combination as defined in claim 19, wherein said effecting means further includes means for so operating said two-stage moving device that the latching movement of that stage which operates said latch commences after a time interval following the commencement of the releasing movement of the other stage which operates said releasing member, which at least corresponds to that between succeeding two of the suspended elements.

22. The combination as defined in claim 19, wherein said two stages of said moving device are arranged in series with one another.

23. The combination as defined in claim 19, wherein said moving device is constructed as a cylinder-and-piston device.

24. The combination as defined in claim 23, wherein said cylinder-and-piston device includes two cylinder-and-piston units arranged in series with one another.

25. The combination as defined in claim 2, further comprising a stopping element mounted upstream of said abutment for movement into and out of said path section, means for urging said stopping element into said path section, and means for moving said stopping element out of said path section, including a pin movable into engagement with said stopping element, and a cylinder-and-piston unit connected to said pin.

26. The combination as defined in claim 2, wherein said effecting means includes means for moving said latch and said releasing member, and means for operating said moving means, including a time-delay member responsive to the movement of said releasing member and having a time constant at least corresponding to the duration of the releasing phase of operation of the latter.

* * * * *